Figure 1:
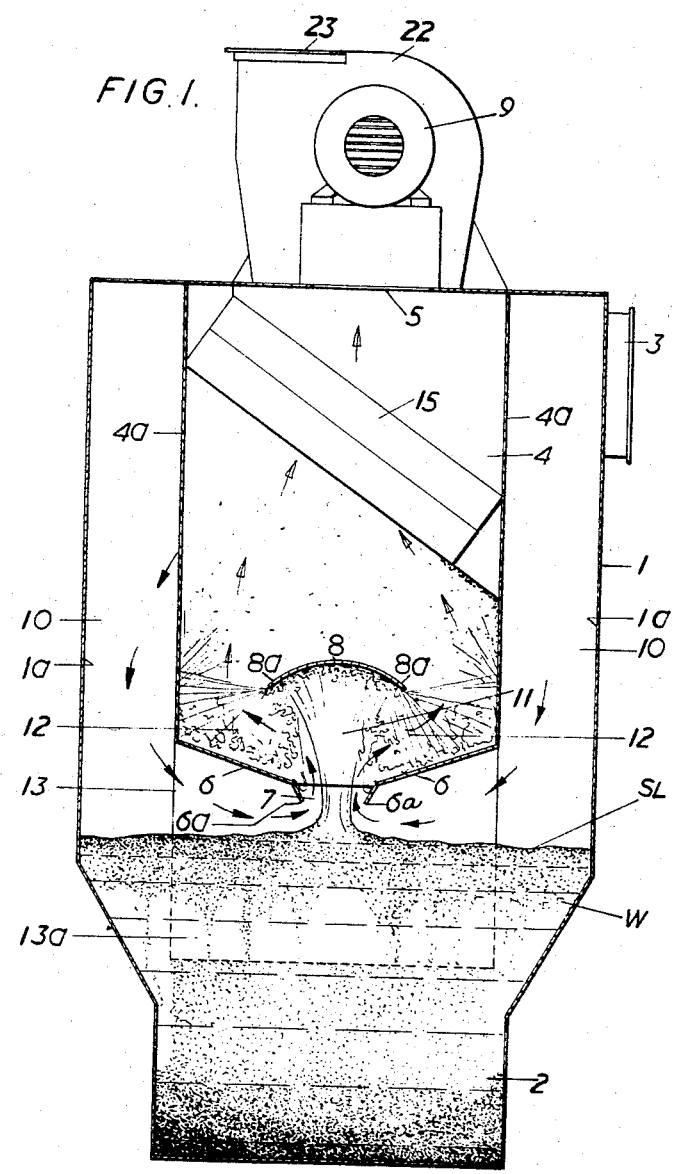

Sept. 23, 1958 P. SWIFT 2,853,152
APPARATUS FOR THE REMOVAL OF SOLID PARTICLES FROM GASES
Filed Feb. 14, 1956 7 Sheets-Sheet 1

Inventor
Peter Swift
By Richard J. Geier
Attorneys

Sept. 23, 1958 P. SWIFT 2,853,152
APPARATUS FOR THE REMOVAL OF SOLID PARTICLES FROM GASES
Filed Feb. 14, 1956 7 Sheets-Sheet 2

Inventor
Peter Swift
By Richards & Geier
Attorneys

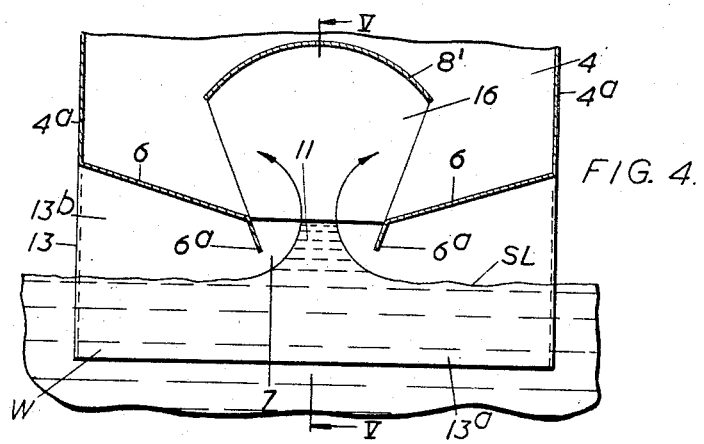
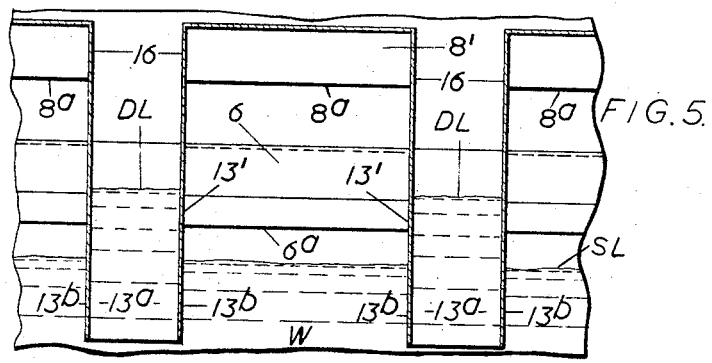
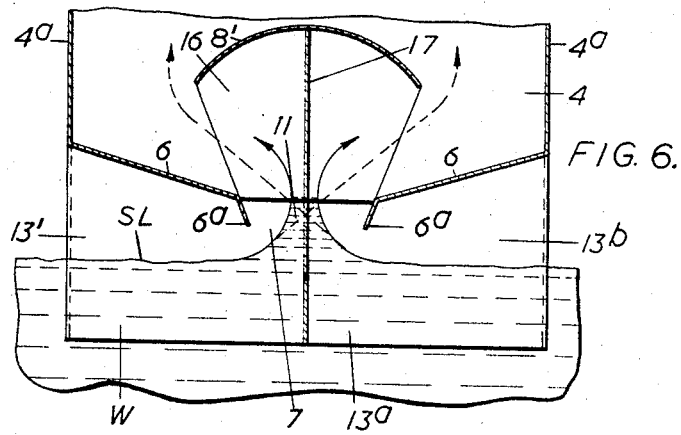

Inventor
Peter Swift
By Richards & Geier
Attorneys

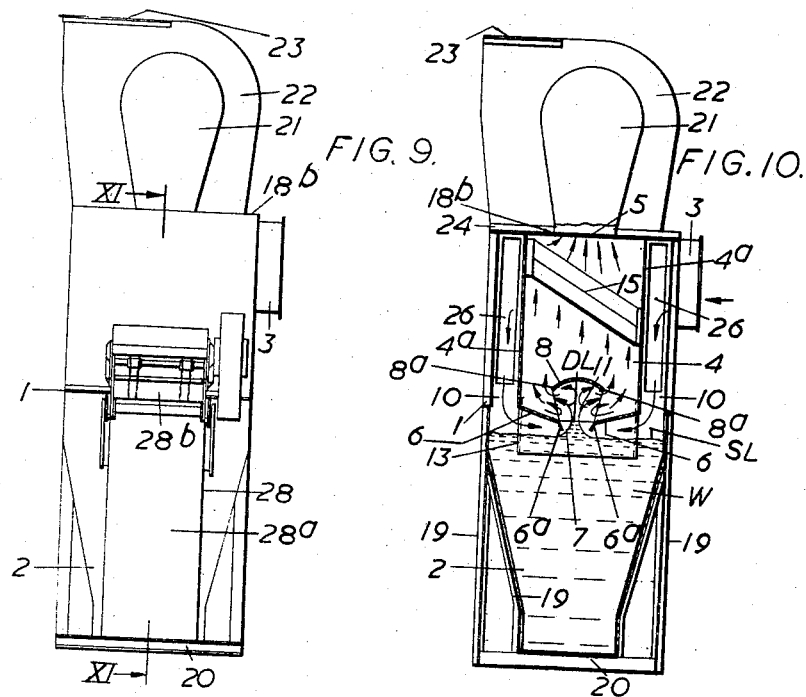

Sept. 23, 1958   P. SWIFT   2,853,152
APPARATUS FOR THE REMOVAL OF SOLID PARTICLES FROM GASES
Filed Feb. 14, 1956   7 Sheets-Sheet 6

Inventor
Peter Swift
By Richard J. Geier
Attorneys

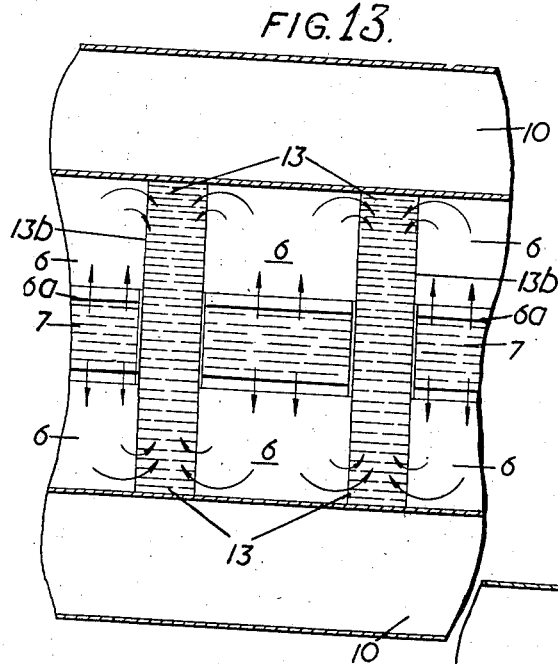
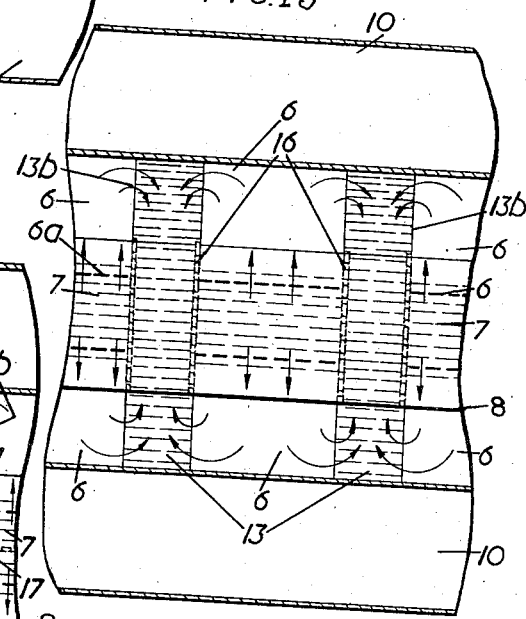
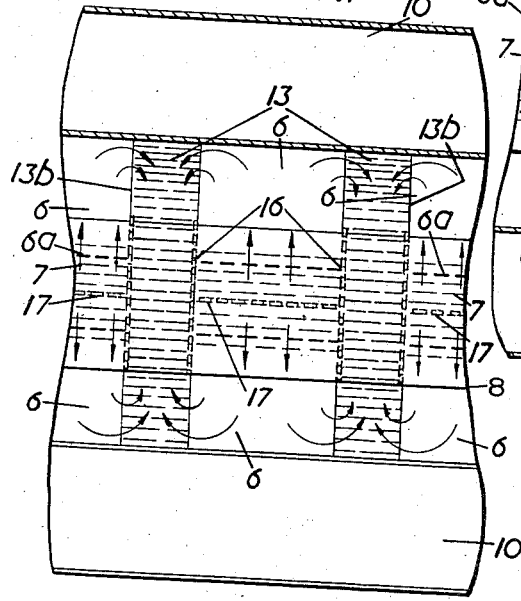

United States Patent Office 2,853,152
Patented Sept. 23, 1958

2,853,152
APPARATUS FOR THE REMOVAL OF SOLID PARTICLES FROM GASES

Peter Swift, Oadby, England, assignor to Dailow, Lambert and Company Limited, Thurmaston, England, a British company Application February 14, 1956, Serial No. 565,442

Claims priority, application Great Britain February 16, 1955

4 Claims. (Cl. 183—26)

This invention relates to apparatus for separating and removing solid particles from gases.

Although not necessarily limited in this respect, the invention can be used in the separation from air of fine and relatively coarse dust or other foreign particles produced around the tools of, say, grinding, cutting, polishing, sanding and many analogous machines used in the engineering, chemical, food and other industries where dust control is necessary. Such extraction of air-borne particles cleans the air and so protects the operators of the machines and others from the harmful effects of dust and fumes. The invention may also be adopted, for instance, in the collection of coal fired boiler effluents. In process industries, moreover, the invention may be used as a convenient means for collecting from gases small particles intended to constitute, or be used in the manufacture of either a main product or a by-product of the process.

The invention, moreover, has reference particularly to separators of the class in which particle-laden gas is introduced into a casing wherein is produced a curtain of liquid droplets through which the gas is caused to pass to effect separation of the particles therefrom.

The primary object of the present invention is to provide a generally improved separator of this class which is not only of compact design but is adapted to give an enhanced performance especially in regard to collection efficiency and ease of maintenance.

Further aims are to provide such a separator which is easily accessible for routine cleaning and in which the necessity for pumps, nozzles, or spray producing rollers is obviated, thereby avoiding wear and chokage.

The separator constituting this invention comprises, in combination, an outer casing the bottom of which is adapted to contain liquid, the said casing having above the liquid level an inlet or inlets for the introduction of particle-laden gas, an inner chamber which is provided within the outer casing and has an outlet for the passage of cleaned gas and a partially open bottom consisting of two opposed baffles located above the liquid level and having a space between their inner edges, a curved baffle arranged within the inner chamber above the opposed bottom baffles, and means creating within the separator a pressure at the inlet or inlets greater than that at the outlet, the construction and arrangement being such that the inflowing particle-laden gas is split, by the presence of conduits between the outer casing and the inner chamber, into two opposing streams which, at the surface of the liquid and mainly below the space between inner edges of the bottom baffles, abruptly entrain an amount of water which is drawn vertically upwards through the said space in the form of a compact column of intermingled gas, particles and liquid, the two gas streams thereupon diverging and the entrained liquid impinging against the curved baffle and being divided into two so as to produce downwardly deflected curtains of liquid droplets or spray which fall on to the upper surfaces of the opposed baffles, the divergent gas streams passing through the curtains and re-uniting above the curved baffle for ultimate passage through the outlet, and the disposition of the bottom baffles being such as to enable the deflected liquid to flow back thereover towards the upwardly rising column of intermingled gas, particles and liquid by which it is further entrained to effect at least some re-circulation thereof, for the purpose specified.

In most cases, although there is no limitation in this respect, the liquid used will be water. Accordingly, the term "water" hereinafter for convenience used in a generic sense in the following further description and in the appended claims is intended to include any other appropriate liquid where the context so admits.

The separator essentially includes provision whereby the entrained and downwardly deflected water (carrying particles separated from the gas streams) can flow back freely from the interior of the inner chamber into the main body of water in the bottom of the casing. In this connection it will be appreciated that any water drawn up from the bottom of the outer casing into the inner chamber through the space between the bottom baffles cannot, of course, flow back into the outer casing through this space while gas is being drawn therethrough at high velocity. For this reason, the downwardly sloping baffle plates constituting the bottom of the inner chamber are suitably apertured to provide entrances into the upper ends of suitable disposed lutes.

When exhausting the gases to atmosphere, means provided for creating within the casing a pressure differing from that of atmosphere may take the form of a suction fan, although it is also within the scope of the invention to employ a blower upstream to the separator creating a pressure higher than that of atmosphere. Generally the gas pressure upstream of the separator must be greater than that existing downstream of the separator.

Figure 2:
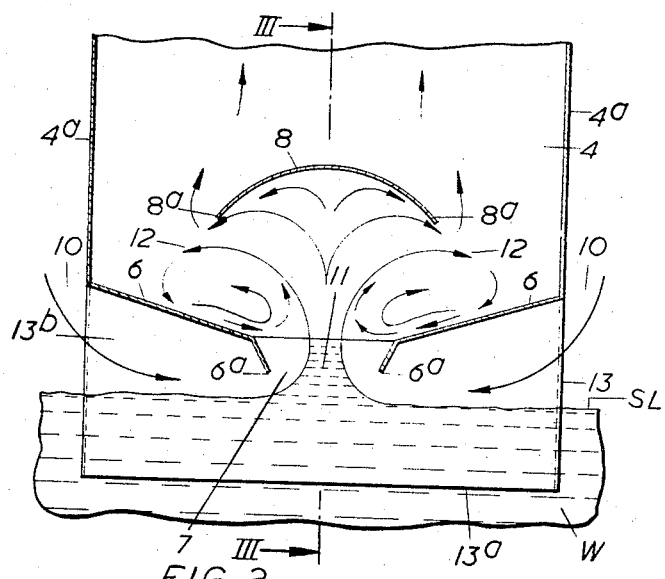
Figure 3:
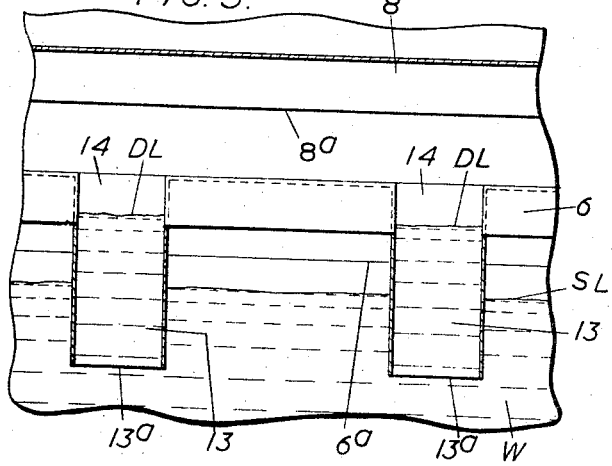
Figure 7:
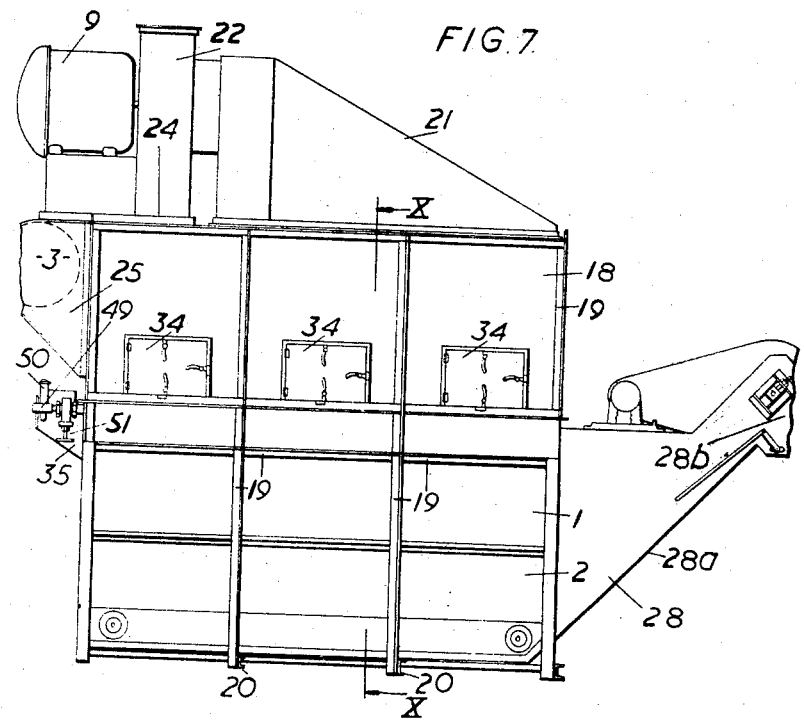
Figure 8:
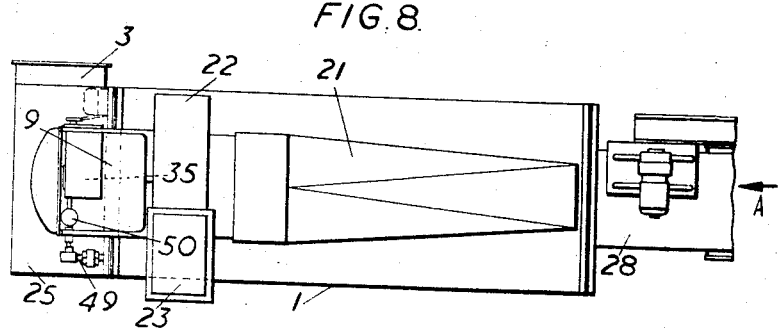
Figure 11:
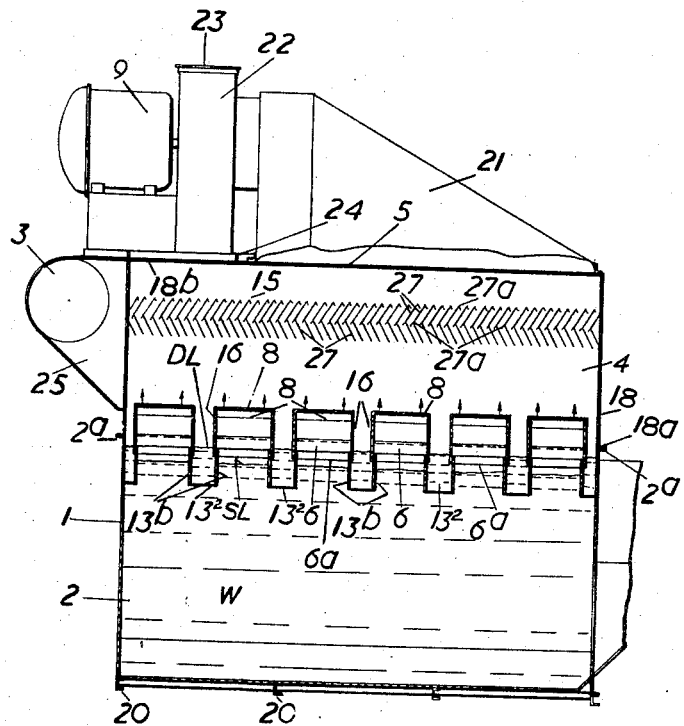
Figure 12:
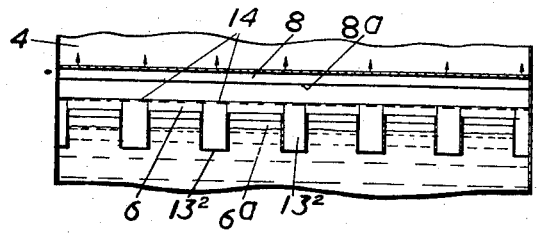

In order that the invention may be more clearly understood and readily carried into practical effect, a typical example of the improved separator, and certain modifications thereof and a specific constructional form of the invention will now be described with reference to the accompanying drawings, wherein, Figure 1 is a purely diagrammatic sectional view of the separator constituting the said example and illustrates in pictorial fashion the manner in which the particles are separated from the opposing gas streams, Figure 2 is a detail vertical sectional view corresponding to the central portion of Figure 1, Figure 3 is a fragmentary sectional view of the separator taken on the line III—III of Figure 2, Figure 4 is a further detail sectional view, similar to Figure 2, but depicting a modification in which the sides of the lutes are extended upwards above the bottom baffles to the top of the curved baffle as and for the purpose hereinafter to be described, Figure 5 is a fragmentary sectional view taken on the line V—V of Figure 4, Figure 6 is another detail sectional view similar to Figure 2 and showing a further modification, Figures 7 and 8 are side elevational and plan views respectively of a specific constructional form of the collector, Figure 9 is an end view of the same as seen in the direction of the arrow A in Figure 8, Figure 10 is a vertical sectional view thereof taken on the line X—X of Figure 7, Figure 11 is a longitudinal sectional view taken on the line XI—XI of Figure 9, Figure 12 is a detail longitudinal sectional view illustrating a modification, Figure 13 is a horizontal sectional view taken below the upper curved baffle 8 and looking downward on baffles 6 in Figure 2.

Figures 14 and 15 are horizontal views looking downward on curved baffle 8 in Figures 6 and 4 of the drawings, respectively.

Like parts are designated by similar reference characters throughout the drawings.

In the example depicted pictorially in Figure 1, which serves primarily to illustrate the principle of operation of the separator, the latter comprises an outer casing 1 the bottom of which is made to contain water W and is provided with a sump 2. Well above the static level SL of the water in the outer casing 1 the latter is furnished with an inlet 3 for the introduction of particle-laden gas (e. g. dust-laden air). Within the casing 1 is provided an inner chamber 4 having an outlet 5 for the passage of cleaned gas. The bottom of this chamber 4 is partially open and consists of two opposed baffles 6 which are located above the static water level SL and have a space 7 between their inner edges 6a. The baffles 6 slope downwardly and inwardly from the sides 4a of the inner chamber 4 to their inner edges 6a. Moreover, the inner marginal edge portions of the bottom baffles 6 are turned down and are steeply inclined inwardly towards one another. Located centrally within the inner chamber 4, above the opposed bottom baffles 6, is an upwardly curved baffle 8. On top of the outer casing 1 is mounted a suction fan 9 arranged to create within the separator a pressure at the inlet 3 greater than that at the outlet 5. The spaces 10 between the sides 4a of the inner chamber 4 and the opposing side walls 1a of the outer casing 1 constitute two vertical down passages or headers.

Particle-laden gas drawn into the upper part of the outer casing 1 through the inlet 3 is split into two streams indicated by the black arrows in Figure 1. These two opposing streams flow down the vertical passages or headers 10 on to the main water surface at the static level SL where they are deflected through 90° bends and thereupon flow beneath the bottom baffles 6. The two opposing streams of particle-laden gas are, therefore, constrained to flow along curved paths so disposed relatively to the surface SL that the coarse and heavier particles are centrifuged out of the two streams and enter the water W. In this way a primary separation of particles from gas is effected at the 90° bends, and the coarse particles centrifuged out of the gas streams settle and are collected in the sump 2. By reason of flowing around the first bends and beneath the bottom baffles 6 as just described, the two opposing air streams meet in violent collision immediately over the surface SL and at a location below the space 7.

The combined gas streams are forced through an abrupt upward turn, that is to say they are bent upwards, and the suction engendered by the fan 9 thereupon draws the streams together with water entrained thereby, vertically upwards into the inner chamber 4 through the gap 7 between the inner edges 6a of the bottom baffles 6. As a consequence of the air streams being bent abruptly upwards at the zone of collision, the main separation of particles from the gas occurs, particles of all sizes being centrifuged out at this location and collected in the sump 2 at the bottom of the main body of the water. In this regard it will be appreciated that the upward bends in the gas streams are of very small radii, this resulting in high inertial forces upon the particles and intimate mixing between water and gas. The gas streams, especially as the inner marginal edge portions of the bottom baffles 6 are turned down and steeply inclined inwardly towards one another as previously mentioned and clearly shown in Figures 1 and 2, then diverge again and as they disengage from the bulk of the water, flow inwardly in opposite directions around the ends of the upwardly curved baffle 8 where they re-unite in a substantially clean condition above the latter. The said gas streams, moreover, create at 11 a copious column of water, and intermixed gas and entrained water impinge violently against the underside of the upwardly curved baffle 8 and are deflected both downwardly on to the top sides of the baffles 6 and outwardly to the sides 4a of the inner chamber 4. The entrained and deflected water is split into two parts each of which produces an intense spray curtain 12 of water droplets extending from the appropriate edge 8a of the curved baffle 8. Thus, prior to disengagement as aforesaid, the diverging gas streams pass through the curtains 12. As a result, a secondary separation of particles from the gas takes place in the areas under the curved baffle 8 to the points of major disengagement of the gas from the water. The further fine particles thereby separated from the gas are collected by the swirling water. During the whole of the period from the point of collision of the gas streams to the final spray curtains 12 of water there is violent turbulence of, and intermixing between, the gas and water. A certain amount of particles will be centrifuged to the irrigated curved deflector plate 8 and more will be collected by impingement on water droplets. In any case, the swirling water drawn up from the outer casing 1 into the inner chamber 4 continuously flows back into the main body of the water in the said casing through spaced lutes 13 (which are open-ended drainage tubes). As will be seen in Figure 3, the downwardly sloping bottom baffle plates 6 are apertured at 14 to provide entrances into the upper ends of the lutes 13 which are open at top and bottom, vertically disposed and of rectangular cross-section. The lower ends 13a of the lutes project down for some distance under the static water level SL. The dynamic level of water in the lutes and in the bottom of the inner chamber 4 is indicated at DL in Figure 3.

The re-united gas streams above the curved baffle 8 flow up through a downwardly inclined spray eliminator 15 (Figure 1) and finally, in a cleaned condition, out of the inner chamber 4 via the outlet 5. The elements of this eliminator, hereinafter to be described, are designed to collect the finer water droplets created by the turbulence between the water and gas.

The entrained water deflected downwardly by the curved baffle 8 on to the sloping bottom baffles 6 flows back over the latter towards and attempts to drain back into the upwardly rising column 11 of intermingled gas particles and water by which (owing to the high velocity of the gas stream) it is further entrained to effect at least some re-circulation of the water, and cause increased turbulence of and intermixing between the gas and water with beneficial effects on the cleaning action. This downward flow of deflected water over the baffles 6 is clearly indicated by the arrows in Figure 2, and the slope of the said baffles provides, additionally, a rapid and effective method of draining the wetted parts of and within the inner chamber, thereby also preventing the accumulation of deposits of solid matter on the surfaces of the baffles 6 whenever the apparatus is not in use.

In the modification of the separator illustrated in Figures 4 and 5, the side plates 13b of the lutes 13' are extended upwards above the bottom baffles 6 to the top of the curved baffle 8', as indicated at 16, so as to reduce, by an amount equivalent to the combined widths of all the lutes, the lengths of the downwardly deflected spray curtains 12 of water droplets. The effect of this modification is to provide transverse gaps in, and so interrupt the continuity of, the curved baffle 8'. In other words the curved baffle is constituted by what is in effect, a series of spaced and similarly curved baffles. As a consequence, the opposed gas streams and entrained water drawn up through the space 7 (similarly interrupted at intervals by the presence of the spaced lutes 13') concentrate in the localities between the pairs of the aforesaid upward extremities 16, whereby the intensity of the spray curtains 12 along the free edges 8a of the gapped or interrupted baffle 8' is increased with beneficial effect on cleaning efficiency.

The extensions 16 may either be integral with the actual side plates 13b of the lutes, or they may be integral with the curved baffle 8' and attached to the upper marginal edge portions of the said side plates as in the specific constructional example of the apparatus hereinafter to be described with reference to Figures 7–11.

For additional collection efficiency there may, if desired, be added to either of the examples of the invention illustrated in Figures 1–5, a central partition 17 (see Figure 6) which extends downwards from the curved baffle 8' into the water W in the outer casing 1, this partition serving to divide into two the column 11 of intermingled gas, particles and water drawn vertically upwards between the bottom baffles 6 and thereby increasing not only the wetted surfaces available for impingement and gas cleaning, but also the turbulence beneath the curved baffle. But over and above these advantages, the presence of a central partition such as 17 prevents any chance particle having an opportunity to travel diagonally through the space 7 between the bottom baffles 6, that is to say in the direction of either of the dotted arrows in Figure 6. In this example, moreover, the two opposing gas streams flowing beneath the baffles 6 do not, of course, collide with one another but instead come into violent collision with opposite sides of the central partition 17. But whether the streams collide with one another or with a central partition, the principle of operation of the separator and the results are the same. The example illustrated in Figure 6, however, calls for an increase in the pressure drop within the separator.

Turning now to a brief description of the specific constructional form of the improved separator depicted in Figures 7–11, the outer casing 1 is fashioned from sheet metal and may, in practice, be made in two parts, viz. an upper part 18 of rectangular form in plan and a lower, downwardly tapering sump 2. The lower edges of the upper part 18 are peripherally flanged, the flanges 18a resting upon and being attached to complementary flanges 2a formed at the upper end of the sump as illustrated in Figure 11. The entire outer casing is supported in and reinforced by a framework formed of lengths of angle and channel irons such as 19 and 20 respectively.

The top 18b of the upper part 18 of the outer casing is common to the inner chamber 4 (see Figure 10), and the outlet 5 in this example, which is provided in the said top 18b, is of elongated form, being covered over by a hood 21 through which cleaned gas is drawn and conveyed to the casing 22 of a suction fan furnished with an exhaust opening 23. The casing 22 is vertically disposed and mounted on a pad 24 by which it is secured upon the top of the casing part 18. Also mounted upon this same pad is the fan motor 9. It is by means of the fan that air is drawn into and through the separator. This is to say the fan, in this particular instance (although the invention is not limited in this respect), is arranged to draw particle-laden gas into the upper end of the outer casing 1 and to extract cleaned gas from the top of the inner chamber 4. The inlet 3 is provided at one end of the casing part 18, and air drawn through this inlet passes into the outer casing 1 via an air intake manifold 25 shown in Figures 7, 8 and 11 and two inlet apertures 26 formed in the adjacent end wall of the casing part 18 at respectively opposite sides of the inner chamber 4 (Figure 10). This chamber is provided by the presence of two vertical and parallel spaced side plates 4a which extend from one end of the outer casing to the other. Thus, the said inner chamber is closed at the top (apart from the outlet 5) by the top 18b, at its ends by the end walls of the outer casing and at its sides by the plates 4a. In all other respects the inner chamber, with its sloping bottom baffles 6, its interrupted curved baffle 8 and the associated upward extensions 16 of the sides of the lutes 13² is similar to that hereinbefore described with reference to Figures 4 and 5. The spaces between the side plates 4a and the opposed side walls of the casing part 18 constitute the vertical conduits 10 into which gas to be cleaned passes through the inlet apertures 26.

The downwardly inclined spray eliminator 15 in this constructional example consists, as shown in Figure 11, of a plurality of spaced elements 27 of zig-zag form designed to provide tortuous passages for the cleaned gas before this flows out of the separator through the outlet 5. The zig-zag elements 27 are formed with downwardly extending lips 27a upon which can collect residual water droplets collected from the cleaned gas. By virtue of the fact that the lips 27a slope downwardly, the residual water is permitted to drain off the spray eliminator at one side of the chamber 4 from whence it flows back into the main body of the water W.

The bottom of the sump 2 is of laterally contracted form, as will be seen in Figures 9 and 10, and the sludge which collects therein may be cleared in a variety of different ways. For example, it may be cleared manually through conveniently placed sludge removal doors. Or manual clearance can be through a bottom entry into wheeled containers, thereby facilitating direct shipment for disposal. In other applications, particularly when dealing with soluble dusts, it may be preferred to empty the sump through a bottom drain valve, e. g. fitted to a cone. But in the particular example illustrated, sludge clearance is effected mechanically by means of a conveyor of the drag link type. Thus, at the end of the separator remote from the air intake manifold 25, the sump portion of the water casing is provided with a conveyor casing 28 having an inclined bottom 28a and a sludge discharge opening 28b at its upper end. The function of the conveyor 28 is to scrape sludge up the inclined bottom 28a automatically while the separator is in operation.

The inner chamber 4 is self cleaning and whenever the fan 9 is shut down the water in this chamber drains rapidly into the sump 2 carrying with it any suspended sludge. Access doors 34 are provided at intervals along the outer walls of the inlet conduits 10, where the particle-laden gas first makes contact with the water; dry sludge build-up at these locations can accordingly be easily hosed away.

Incidentally, Figure 12 shows a modification of the apparatus described with reference to Figures 7–11, according to which the curved baffle 8 is continuous from one end of the inner chamber 4 to the other so that uninterrupted spray curtains will issue from the free longitudinal edges of the baffle; this modification is accordingly similar to that diagrammatically illustrated in Figures 1 to 3.

The improved wet separator may advantageously be provided with means for controlling the static and dynamic water levels SL and DL respectively. The water control box provided for this purpose is of known form and is indicated in a general way by the reference numeral 35 in each of Figures 7 and 8. In these figures 49 is the main water supply pipe and 50 is a valve for controlling such water. At 51 is indicated a rapid fill valve, details of which do not require to be described.

I claim:

1. A separator for removing solid particles from gas comprising, in combination, an outer casing the bottom of which contains water, said casing having above the water level at least one inlet for the introduction of particle-laden gas, an inner chamber which is provided within the outer casing and has an outlet for the passage of cleaned gas and a partially open bottom consisting of two opposed baffles located above the water level and having a space between their inner edges, said bottom baffles having therein a series of apertures and sloping downwardly and inwardly from the sides of the said inner chamber, and the inner marginal edge portions of the same baffles being turned down so as to be steeply inclined towards one another, two vertical passages constituted by spaces between the sides of the inner chamber and the opposing side walls of the outer casing, a curved baffle arranged within the inner chamber above the opposed downwardly sloping bottom baffles, means creating within the separator a pressure at the inlet greater than that at the outlet, and a series of open-ended drainage tubes which extend down from the apertures in the downwardly sloping baffles into the outer casing below the level of the water therein, said apertures providing entrances into the drainage tubes, whereby inflowing particle-laden gas divides into two opposing streams which pass down the vertical passages and flow at high velocity beneath the bottom baffles so that each such stream is constrained to flow along a curved path so disposed relatively to the surface of the water that the coarser and heavier particles are centrifuged out of the steam and deposited in and collected by the water whereupon at the surface of the water and mainly below the aforesaid space said two opposing streams abruptly entrain an amount of water which is drawn vertically upwards through said space in the form of a compact column of intermingled gas, particles and water, the two gas streams thereupon diverging and the water impinging against the curved baffle and being divided so as to produce downwardly deflected curtains of water droplets which fall on to the upper surfaces of the opposed bottom baffles, the divergent gas streams passing through the curtains and re-uniting above the curved baffle for ultimate passage through the outlet, and the sloping disposition of the bottom baffles being such as to enable the deflected water to flow back thereover towards the upwardly rising column of intermingled gas, particles and water by which it is further entrained to effect at least some re-circulation thereof, and the water returning freely down the drainage tubes into the water at the bottom of the outer casing while being isolated from the gas stream and without interfering with the high velocity of the gas stream.

2. A separator according to claim 1, wherein at the location where they entrain water the opposing streams of particle-laden gas are permitted to move into violent collision as a result of which they are turned abruptly upwards and their paths, immediately above the surfaces of the water, include sharp bends of small radii so that as the streams flow at relatively high velocity around these bends some of the particles will be centrifuged out of the streams and impacted against the surface of the water in which the said particles are retained.

3. A separator according to claim 1, which includes a spray eliminator located within the inner chamber above the curved baffle, for the purpose described.

4. A separator according to claim 1, wherein each of the open-ended drainage tubes is vertically disposed and comprises a pair of spaced side plates having ends firmly connected with said sides of the inner chamber.

References Cited in the file of this patent

UNITED STATES PATENTS

| | | |
|---|---|---|
| 1,960,260 | Acton | May 29, 1934 |
| 2,259,626 | Erikson | Oct. 21, 1941 |
| 2,321,653 | Carlson | June 15, 1943 |
| 2,380,065 | Newcomb | July 10, 1945 |
| 2,403,545 | Nutting | July 9, 1946 |
| 2,414,718 | Christensen | Jan. 21, 1947 |